United States Patent [19]

Wyss

[11] Patent Number: 4,861,353
[45] Date of Patent: Aug. 29, 1989

[54] FILTER ELEMENT AND ASSEMBLY

[75] Inventor: Kurt H. Wyss, Meyrin, Switzerland

[73] Assignee: E. I. Du Pont de Nemours and Company, Wilmington, Del.

[21] Appl. No.: 129,211

[22] Filed: Dec. 7, 1987

[51] Int. Cl.$^4$ .............................................. B01D 46/04
[52] U.S. Cl. .......................................... 55/96; 55/97; 55/302; 55/341.1; 55/379; 55/382; 55/528
[58] Field of Search ................... 55/96, 97, 302, 341 R, 55/372, 378, 379, 382, 528, DIG. 5

[56] References Cited

U.S. PATENT DOCUMENTS

| | | | |
|---|---|---|---|
| 2,910,763 | 11/1959 | Lauterbach | 55/528 X |
| 2,933,154 | 4/1960 | Lauterbach | 55/528 X |
| 3,937,621 | 2/1976 | Gravley | 55/528 X |
| 3,957,938 | 5/1976 | Gravley | 55/528 X |
| 3,986,851 | 10/1976 | Grodek | 55/528 X |
| 4,025,679 | 5/1977 | Denny | 55/528 X |
| 4,070,519 | 1/1978 | Lefkowitz et al. | 55/528 X |
| 4,100,323 | 7/1978 | Forsten | 55/528 X |
| 4,231,770 | 11/1980 | Johnson, Jr. | 55/379 X |
| 4,257,791 | 3/1981 | Wald | 55/382 |
| 4,270,935 | 6/1981 | Reinauer | 55/379 |
| 4,280,826 | 7/1981 | Johnson, Jr. | 55/302 |
| 4,297,115 | 10/1981 | Johnson, Jr. | 55/341 R X |
| 4,324,574 | 4/1982 | Fagan | 55/528 X |
| 4,361,619 | 11/1982 | Forsten et al. | 55/528 X |
| 4,536,439 | 8/1985 | Forsten | 55/528 X |
| 4,588,464 | 5/1986 | Miyagi et al. | 55/DIG. 5 |
| 4,612,237 | 9/1986 | Frankenburg | 55/528 X |
| 4,689,059 | 8/1987 | Magdelain | 55/382 |

FOREIGN PATENT DOCUMENTS 2826510 1/1979 Fed. Rep. of Germany ........ 55/379
2157586 10/1985 United Kingdom ................... 55/528

Primary Examiner—Robert Spitzer

[57] ABSTRACT

A tubular textile of filamentary poly (tetrafluoroethylene) useful to prolong the mechanical life of a filter material. An assembly for filtering comprising a cage, the tubular filamentary PTFE, and a superjacent filter.

6 Claims, No Drawings

FILTER ELEMENT AND ASSEMBLY

FIELD OF THE INVENTION

This invention relates to the field of filtration of gases containing entrained particles. More particularly, this invention relates to an element in a filter assembly of the class of filter assemblies known as the "outside bag" filtration devices, to such devices containing such an element, and to the process of filtering gases using an assembly containing the element. This invention increases the operational life of filters used in the filtration of gases containing entrained particles.

BACKGROUND OF THE INVENTION

One widely used commercial design for removing particulate matter (dust) from gas streams utilizes a method which has been designated as the "outside bag" dust collection principle. In this design, dust-containing gas flows into a large compartment containing a plurality of long, substantially cylindrical filter bags, each bag being suspended by its ring-shaped top. A cylindrical wire cage internally supports the bag and prevents collapse of the filter bag when the gas is flowing into it. The dust collects around the outside of the bag, while the cleaned gas flows into and upward through the bag and out the top of the bag into the clean air outflow conduits. The dust collected on the outside surface of the bag is periodically removed by releasing a split-second reverse-flow pulse of compressed air into the top of the bag. The compressed air travels down the length of the bag, causing it to expand. When the pulse of reverse-flow air is stopped, the bag contracts against the cylindrical wire support cage. The expansion and the contraction of the bag causes the collected particles to fall off the bag and be collected. The pulses of reverse-flow air may also cause the bag to "grow" (increase in area of the fabric) over a number of cycles. The contraction against the cage causes the bag to abrade, and the abrasion becomes more severe if the bag grows irreversibly. The pulse of reverse-flow air is usually applied to one row of bags at a time in sequence so that the main flow of dust-containing air into the baghouse and clean air flow from it are not interrupted.

It is known to make the filter for "outside bag" filtration devices of poly(m-phenylene isophthalamide)—see Forsten U.S. Pat. No. 4,536,439, or poly(tetrafluoroethylene), or glass fiber, or blends of these and other fibers—see Forsten et al. U.S. Pat. No. 4,361,619.

Various means have been proposed in the past to increase operational life of the filters, for example, it has been suggested that the filter be made thicker so that it would take longer to wear through, and it has been suggested that the pulse of air that is released into the filter bag to shake off the particles be released through a multi-perforated hollow metal cylinder located inside the filter bag—this latter system is known commercially as the "Staclean" diffuser system.

DESCRIPTION OF THE INVENTION

It has now been found that the operational life of a filter can be increased by reducing the abrasion between the filter and the wire cage that supports the filter by first covering the cage with a highly gas permeable tubular textile of filamentary poly(tetrafluoroethylene) (sometimes hereinafter referred to as PTFE), and then applying the tubular filter bag in the usual fashion.

The tubular textile of filamentary poly(tetrafluoroethylene), reduces the abrasion in two distinctly different ways, first, it acts to prevent direct metal to filter contact and second, it lowers the extent to which the filter is pressed, by the gas to be filtered, into the interstices of the support cage. Thus, the abrasion is reduced and the filter is less likely to be stretched by pressure from the gas being filtered.

The tubular poly(tetrafluoroethylene) textile element of this invention is substantially nonrestrictive to gas flow, that is, it has a gas permeability of at least 1000 ft$^3$ per ft$^2$ per minute, measured at a pressure of inch of water (At least 300 m$^3$ per m$^2$ per minute at a p of 1 cm of water). Preferably, the tubular textile element has a basis weight of about 2 to about 6 oz per sq yd. (about 68 to about 204 g/sq. m). The tubular element may be made of poly(tetrafluoroethylene) monofilament or of multifilament yarn. Tubular elements made from monofilaments contain filaments of a linear density of about 100 denier (110 decitex) and larger, while the tubular elements made from multifilament yarns contain fibers of a denier per filament of less than 100, and the yarns have a linear density of 200 to 2000 denier —a decitex of 220 to 2200.

The filtering assembly which includes the poly(tetrafluoroethylene) elements comprises the supporting cage, the PTFE element and the filter bag. The supporting cage ma be formed of ferrous metal, i.e., soft steel rods or stainless steel, or steel with a chemically resistant coating—other abrasion resistant metals and metal alloys may also be used. The filter bag may be any known in the art, for example, PTFE bags, poly(m-phenylene isophthalamide) bags, bags of blends of PTFE and glass fiber, acrylic fiber bags, bags of polyphenylene sulfide fiber, bags of glass fiber batts having abrasion resistant coatings such as poly-fluorocarbon coatings. See Forsten et al. U.S. Pat. No. 4,361,619. Such filter bags may be made with or without supporting scrims. The particular filter bag that will be used with the tubular element will depend on the particular gas to be filtered, the composition and size of the particles to be removed, the temperature of the gas and other factors.

The tubular textile elements may be fabricated by a tubular knitting process, to make an open knit or netlike structure or the tubular elements may be made by stitching an open weave fabric into a cylindrical (tubular) shape.

The tubular PTFE textile element may be made of monofilaments—i.e., filaments having a denier of at least 100 (decitex of at last 110), or of multifilament yarns in which the yarns are composed of filaments having a denier of less than 100 (decitex of less than 110). If multifilament yarns are used the yarns should have a denier in the range of about 200 to 2000 (decitex of about 220 to 2200).

The tubular textile of PTFE should have a weight in the range of about 2 to 6 oz per yd$^2$ (about 68 to 204 g/sq.m).

EXAMPLE

A filter cage having a length of 95 inches (241 cm) and a diameter of 4.75 inches (12.1 cm), made of 10 wires (4 mm in diameter) evenly spaced (1.5 inch=3.8 cm apart) that ran the length of the cage, and evenly spaced rings (4 inches=10 cm apart), was fitted with a tubular knitted textile of poly-(tetrafluoroethylene) made from yarn having a linear density of 1800 denier (1980 decitex). The textile had a weight of about 150 g/m². The textile had an air permeability of about 1000 ft³ per ft² per minute at a pressure of ½ inch of water (about 300 m³ per m² per min. at a pressure of 1 cm of water. The tubular textile was about 20% larger in diameter than the cage. The cage was inserted in the tubular textile. The textile attached to the cage by a fixation ring at the top of the cage, and the lower end of the tubular textile which extended beyond the cage tied in a knot. The tubular textile was then heated to 300° C. for one hour. This caused the tube to shrink and assume the dimension of the cage. A standard filter bag was then superimposed over the tubular textile, and the assembly tested in gas filtration tests, using periodic internal gas pulses to remove particular matter from the outer surface of the bag, against control assemblies that did not contain the tubular poly(tetrafluoroethylene) textile. The assembly containing the tubular poly(tetrafluoroethylene) textile was superior to the control assemblies. It was also at least as good as any special assembly tested including assemblies containing internal air diffusers and assemblies having special cages containing a larger number of longitudinal wires and more evenly spaced rings.

I claim:

1. In a process of filtering a gas containing particulate matter using an outside bag filtration system, in which the bag is flexed and particulate matter removed from the outside surface of the bag by pulses of gas released inside the bag, the improvement comprising the steps of covering the cage of the outside bag filtration system with a tubular textile of poly(tetrafluoroethylene) having an air permeability of at least 1000 ft³ per ft² per minute at a pressure of ½ inch of water said tubular textile conforming to the outer dimension of the cage, and then applying the filter bag in the standard manner.

2. An assembly for filtering hot gases containing particulate matter comprising a cage covered with a tubular textile of poly(tetrafluoroethylene) having an air permeability of greater than 1000 ft³ per ft² per minute at a pressure of ½ inch of water said tubular textile conforming to the outer dimension of the cage, and superjacent to said tubular textile layer a filtration layer of conventional design and construction.

3. A tubular textile composed of filamentary poly(tetrafluoroethylene) said tubular textile having an air permeability of greater than 1000 ft³ per ft² per minute at a pressure of ½ inch of water.

4. The tubular textile of claim 3 having a weight in the range of 2 to 6 oz per yd².

5. The tubular textile of claim 3 in which the poly(tetrafluoroethylene) of the textile is present as monofilaments having deniers of at least 100.

6. The tubular textile of claim 3 in which the poly(tetrafluoroethylene) of the textile is present as a multifilament yarn, and the filaments of the yarn have deniers of less than 100.

* * * * *